United States Patent [19]
Hanson et al.

[11] Patent Number: 5,161,384
[45] Date of Patent: Nov. 10, 1992

[54] METHOD OF OPERATING A TRANSPORT REFRIGERATION SYSTEM

[75] Inventors: Jay L. Hanson, Bloomington; Lowell B. Naley, Minnetonka; Norman F. Spear, Edina, all of Minn.

[73] Assignee: Thermo King Corporation, Minneapolis, Minn.

[21] Appl. No.: 833,230

[22] Filed: Feb. 10, 1992

[51] Int. Cl.$^5$ ............................................. F25B 49/00
[52] U.S. Cl. ........................................ 62/126; 62/130; 62/158; 340/585
[58] Field of Search .................. 62/125, 126, 127, 128, 62/129, 130, 158, 160, 203, 208, 209; 165/11.1; 236/94; 340/584, 585, 588

[56] References Cited

U.S. PATENT DOCUMENTS

| | | | |
|---|---|---|---|
| 4,211,089 | 7/1980 | Mueller et al. | 62/126 X |
| 4,232,530 | 11/1980 | Mueller | 62/126 X |
| 4,395,886 | 8/1983 | Mayer | 62/160 |
| 4,407,141 | 10/1983 | Paddock | 340/585 X |
| 4,493,191 | 1/1985 | Hanson | 340/588 X |
| 4,790,143 | 12/1988 | Hanson | 62/126 |
| 4,949,550 | 8/1990 | Hanson | 62/126 |

Primary Examiner—Harry B. Tanner
Attorney, Agent, or Firm—D. R. Lackey

[57] ABSTRACT

A method of monitoring a transport refrigeration system which is effective regardless of the temperature of a served space relative to a selected set point temperature. Different "windows" of acceptable and marginal performance are provided in the form of different minimum magnitudes of $\Delta T$, i.e., the algebraic difference between the return and discharge air temperatures, as a function of ambient and return air temperatures. The transport refrigeration system is thus monitored at all times, during both cooling and hot gas heating modes, and also including during initial temperature pull down of the cargo space, enabling an early warning to be generated for a marginal performance, and an early shut down to be initiated for unacceptable performance. In a preferred embodiment, a maximum value of $\Delta T$ is also provided, which, if exceeded by the actual $\Delta T$, indicates a restricted air flow in the cargo space.

21 Claims, 14 Drawing Sheets

| AA → AMBIENT AIR<br>RA → RETURN AIR<br>DA → DISCHARGE AIR<br>$\Delta T$ = DA - RA | | | COOLING MODE | | | HEATING MODE | | |
|---|---|---|---|---|---|---|---|---|
| | | | $\Delta T$ | | | $\Delta T$ | | |
| PROGRAM # | AA | RA | NORMAL | WARNING ALARM | SHUT DOWN ALARM | NORMAL | WARNING ALARM | SHUT DOWN ALARM |
| 1 | > +70 (+21.1) | > +70 (+21.1) | > -12 (-6.7) | -6 → -12 (-3.3 → -6.7) | DA ≥ RA < -6 (-3.3) | > +10 (+5.6) | +2 → +8 (+1.1 → +4.4) | RA > DA < +2 (+1.1) |
| 2 | > +50 (+10) | +51 → [+70] (+10.6 → +21.1) | > -10 (-5.6) | -5 → -9 (-2.8 → -5) | DA ≥ RA < -5 (-2.8) | > +8 (+4.4) | +2 → +7 (+1.1 → +3.9) | RA > DA < +2 (+1.1) |
| 3 | > +30 (-1.1) | +31 → [+50] (-.56 → +10) | > -8 (-4.4) | -4 → -7 (-2.2 → -3.9) | DA ≥ RA < -4 (-2.2) | > +6 (+3.3) | +2 → +5 (+1.1 → +2.8) | RA > DA < +2 (+1.1) |
| 4 | > +10 (-12.2) | +11 → [+30] (-11.7 → -1.1) | > -6 (-3.3) | -3 → -5 (-1.7 → -2.8) | DA > RA < -3 (-1.7) | > +6 (+3.3) | SET POINT < 24 (-4.4)<br>RA > DA<br>+2 → +5 (+1.1 → +2.8) | SET POINT > 24 (-4.4)<br>RA > DA < +2 (+1.1) |
| 5 | ALL<br><br>< +10 (-12.2) | < +10 (-12.2)<br><br>ALL | > -4 (-2.2) | -1.5 → -3 (-.83 → -1.7) | DA ≥ RA < -1.5 (-.83) | > +4 (+2.2) | SET POINT < 24 (-4.4)<br>RA > DA<br>+2 → +3 (+1.1 → -1.7) | SET POINT > 24 (-4.4)<br>RA > DA < +2 (+1.1) |

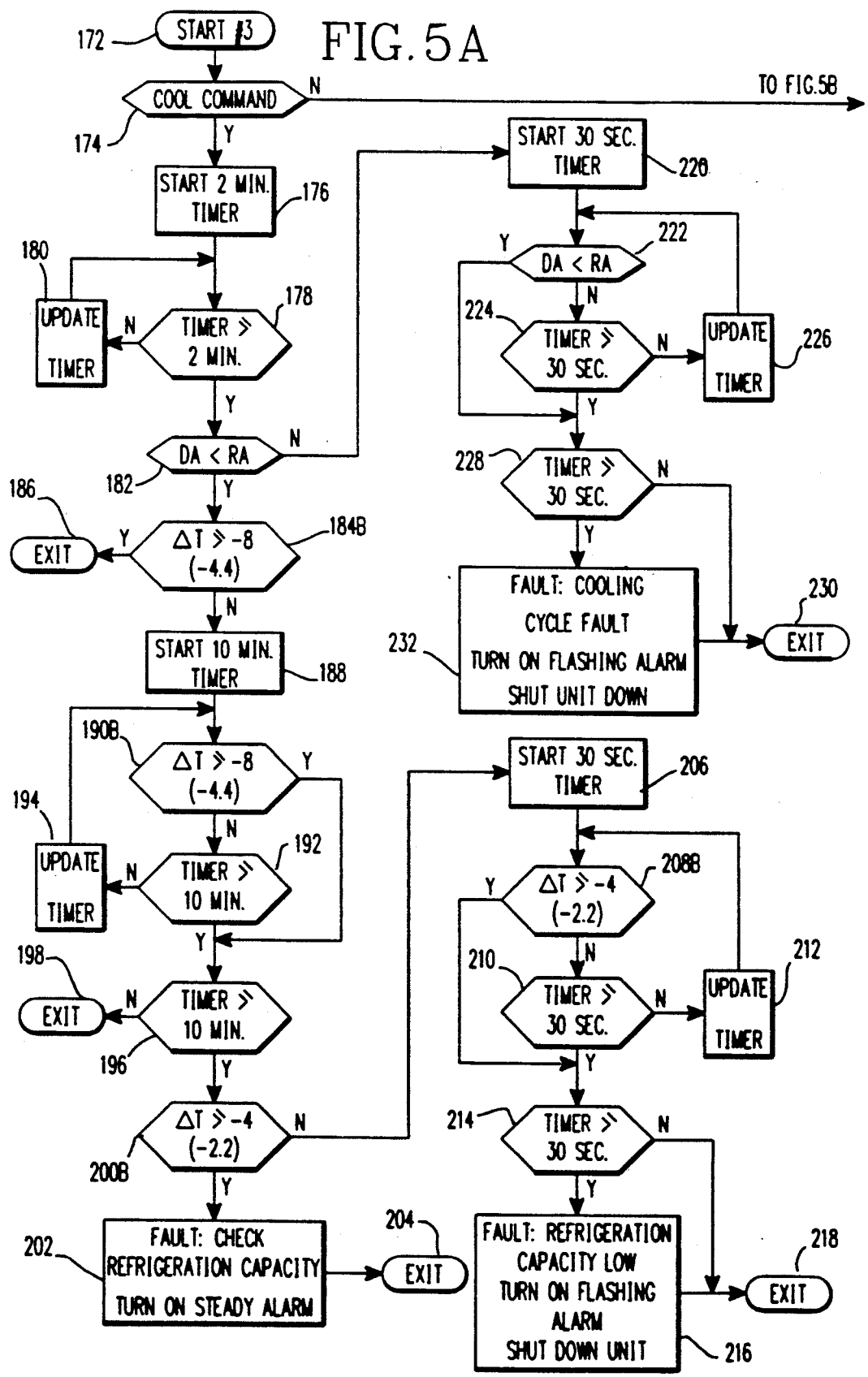

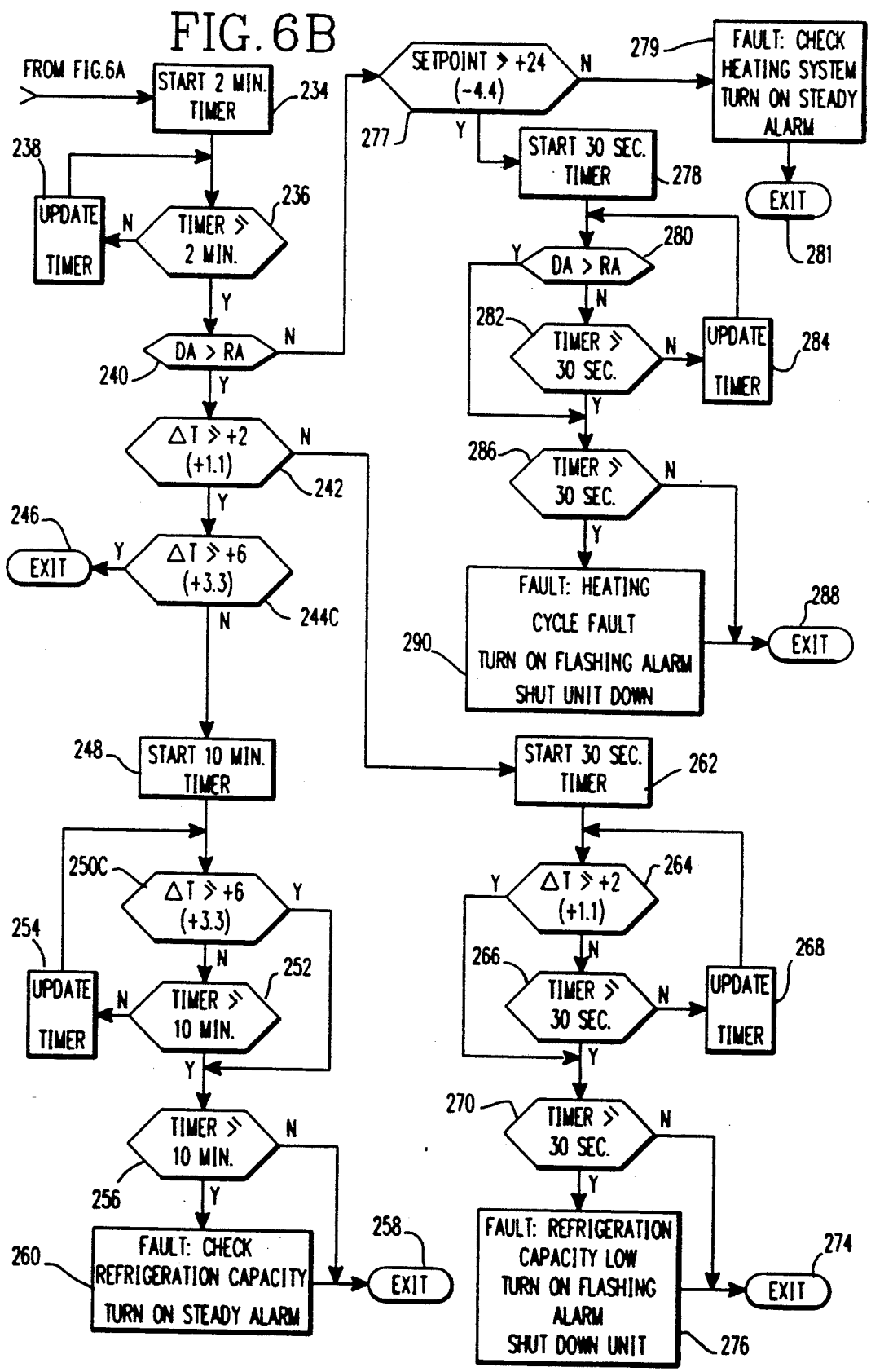

FIG. 8

AA → AMBIENT AIR
RA → RETURN AIR
DA → DISCHARGE AIR
ΔT = DA − RA

| PROGRAM # | AA | RA | COOLING MODE NORMAL | COOLING MODE ΔT WARNING ALARM | COOLING MODE SHUT DOWN ALARM | HEATING MODE NORMAL | HEATING MODE ΔT WARNING ALARM | HEATING MODE SHUT DOWN ALARM |
|---|---|---|---|---|---|---|---|---|
| 1 | > +70 (+21.1) | > +70 (+21.1) | ≥ −12 (−6.7) | −6 → −12 (−3.3 → −6.7) | DA ≥ RA < −6 (−3.3) | ≥ +10 (+5.6) | +2 → +8 (+1.1 → +4.4) | RA ≥ DA < +2 (+1.1) |
| 2 | > +50 (+10) | +51 → [+70] (+10.6 → +21.1) | ≥ −10 (−5.6) | −5 → −9 (−2.8 → −5) | DA ≥ RA < −5 (−2.8) | ≥ +8 (+4.4) | +2 → +7 (+1.1 → +3.9) | RA ≥ DA < +2 (+1.1) |
| 3 | > +30 (−1.1) | +31 → [+50] (−.56 → +10) | ≥ −8 (−4.4) | −4 → −7 (−2.2 → −3.9) | DA ≥ RA < −4 (−2.2) | ≥ +6 (+3.3) | +2 → +5 (+1.1 → +2.8) | RA ≥ DA < +2 (+1.1) |
| 4 | > +10 (−12.2) | +11 → [+30] (−11.7 → −1.1) | ≥ −6 (−3.3) | −3 → −5 (−1.7 → −2.8) | DA ≥ RA < −3 (−1.7) | ≥ +6 (+3.3) | SET POINT < 24 (−4.4) +2 → +5 (+1.1 → +2.8) RA ≥ DA | SET POINT > 24 (−4.4) RA ≥ DA < +2 (+1.1) |
| 5 | ALL | < +10 (−12.2) | ≥ −4 (−2.2) | −1.5 → −3 (−.83 → −1.7) | < −1.5 (−.83) | ≥ +4 (+2.2) | SET POINT < 24 (−4.4) +2 → +3 (+1.1 → −1.7) RA ≥ DA | SET POINT > 24 (−4.4) RA ≥ DA < +2 (+1.1) |
| 5 | < +10 (−12.2) | ALL | | | | | | |

1

METHOD OF OPERATING A TRANSPORT REFRIGERATION SYSTEM

TECHNICAL FIELD

The invention relates in general to transport refrigeration systems, and more specifically to methods for monitoring the operation of transport refrigeration systems.

BACKGROUND ART

Transport refrigeration system monitoring methods of the prior art conventionally monitor refrigeration capacity and adequacy of refrigerant charge once the system pulls the temperature of the served cargo space "in range", i.e., when the temperature of the served cargo space approaches the selected set point temperature of the cargo space. It would be desirable, and it is an object of the present invention, to be able to monitor the operation of a transport refrigeration system for capacity and adequacy of refrigerant charge at all times, during both cooling and hot gas heating modes, and also including the initial temperature pull down of the cargo space.

Prior art transport refrigeration system monitoring methods do not detect improperly loaded cargo spaces, or shifted loads in cargo spaces which result in improper loading. Thus, in addition to providing earlier warnings and shut downs for marginal and improper operation of a transport refrigeration system, it is also an object of the invention to be able to monitor the cargo space served by a transport refrigeration system, for restricted air flow, such as caused by improper loading, or load shifting.

SUMMARY OF THE INVENTION

Briefly, the invention is a method of monitoring a transport refrigeration system which conditions air returned from a cargo space via commanded cooling and heating modes, as required to hold a predetermined set point temperature, and discharges the conditioned air back into the cargo space. The transport refrigeration system includes sensors which monitor the temperatures of the return air, discharge air, and ambient air.

The method includes the steps of providing an algebraic difference $\Delta T$ between the temperatures of the return air and the discharge air, selecting parameters for comparison with $\Delta T$ as a function of the ambient and return air temperatures, and comparing $\Delta T$ with the selected parameters to detect a malfunction in the operation of the transport refrigeration system, regardless of temperature of the return air relative to the selected set point temperature.

The step of selecting parameters selects minimum values which must be met by the comparison step to enable continued operation of the transport refrigeration system. The parameters include normal, warning and shutdown values of $\Delta T$, with the step of selecting parameters reducing the magnitudes of the normal, warning and shutdown values of $\Delta T$ in predetermined steps as the temperature of the return air is reduced.

In a preferred embodiment of the invention, the method includes the step of selecting a maximum value for $\Delta T$, in addition to the step of selecting minimum values which must be met by the comparison step to enable continued operation of the transport refrigeration system, and the step of comparing $\Delta T$ with said selected maximum value. An alarm signal is provided which indicates restricted air flow, such as caused by an improperly packed load in the cargo space, or a shifted load, when the comparison step finds that the actual $\Delta T$ exceeds said selected maximum value.

BRIEF DESCRIPTION OF THE DRAWINGS

The invention will become more apparent by reading the following detailed description in conjunction with the drawings, which are shown by way of example only, wherein:

FIGS. 5A and 5B may be assembled to provide a detailed flow chart of a program #3 which is called by the program of FIG. 2 in response to a predetermined relationship between ambient and return air temperatures;

FIGS. 6A and 6B may be assembled to provide a detailed flow chart of a program #4 which is called by the program of FIG. 2 in response to a predetermined relationship between ambient and return air temperatures;

FIG. 8 is a chart which summarizes the minimum normal, marginal, and unacceptable #T values for the different relationships of ambient air and return air temperatures used in the programs called by the program set forth in FIG. 2.

DESCRIPTION OF PREFERRED EMBODIMENTS

Figure 1:
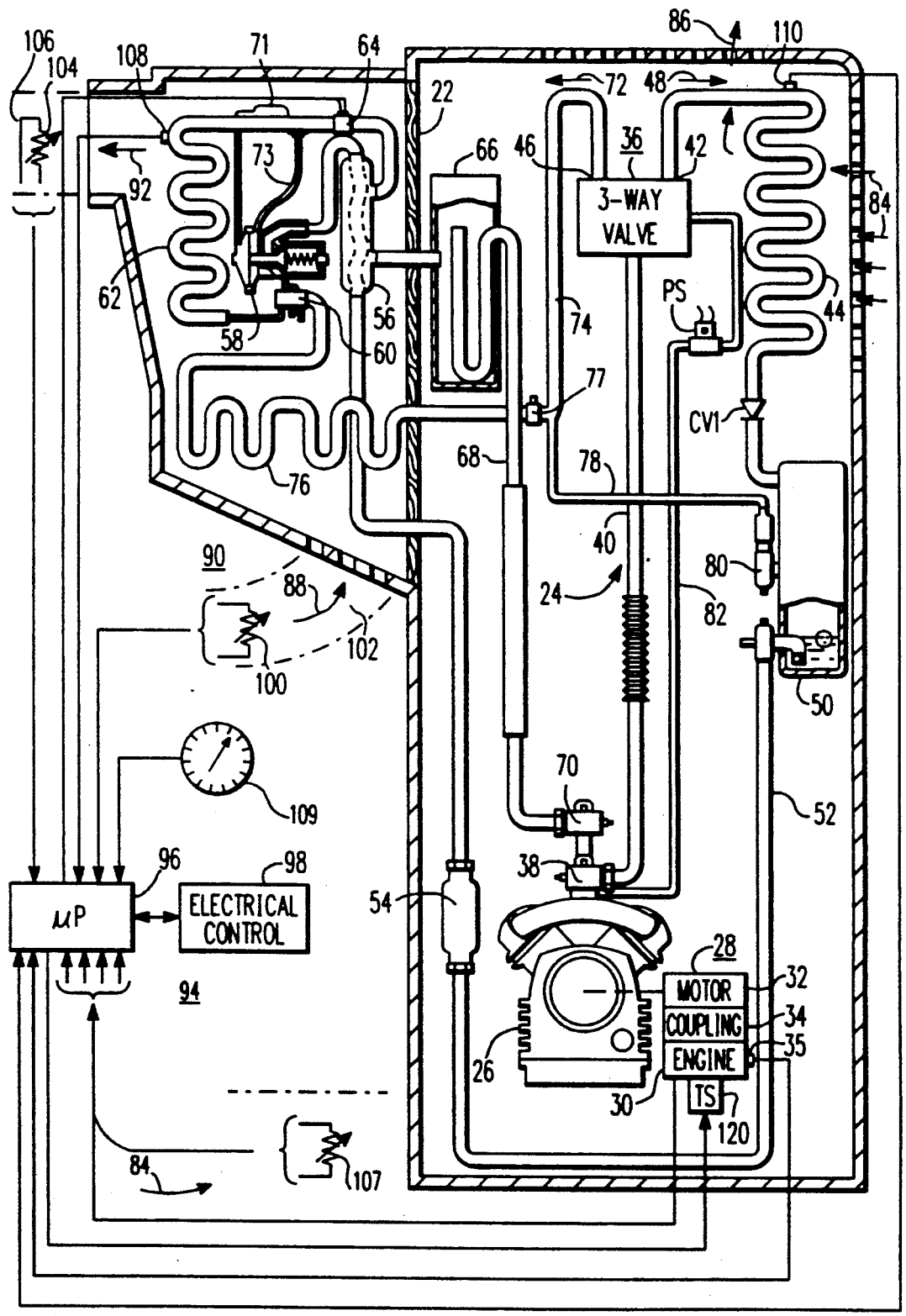
FIG. 1 is a schematic refrigerant piping diagram, and associated electrical control, of a transport refrigeration system which may be operated according to the method teachings of the invention.

Referring now to the drawing, and to FIG. 1 in particular, there is shown a transport refrigeration unit 20 which may be monitored according to the methods of the invention. Refrigeration unit 20 may be mounted on a container, truck, or trailer, such as on a wall 22 thereof, for example.

Refrigeration unit 20 has a closed fluid refrigerant circuit 24 which includes a refrigerant compressor 26 driven by a prime mover arrangement 28. Prime mover arrangement 28, for example, may include an internal combustion engine 30, and it may optionally include a stand-by electric motor 32. Engine 30 and motor 32 are coupled to compressor 26 by a suitable clutch or coupling 34 which disengages engine 30 while motor 32 is operative.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described.

When three-way valve 36 selects the cooling cycle output port 42, it connects compressor 26 in a first refrigerant circuit 48, which, in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. Expansion valve 58 is controlled by a thermal bulb 71 and an equalizer line 73.

The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may optionally be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low pressure side of compressor 26 via a normally closed pilot solenoid valve PS. When solenoid valve PS is de-energized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served cargo space 90 whose air is to be conditioned, through the evaporator coil 62, and the resulting conditioned, cooled or heated, air 92, called "discharge air", is returned to the cargo space 90. During an evaporator defrost cycle a defrost air damper, if utilized, may be operated to close the discharge air path to the conditioned space 90; or, the evaporator blower or fan, if independently controlled, may be stopped.

Transport refrigeration unit 20 is controlled by microprocessor based electrical control 94 which includes a microprocessor 96 and associated electrical control 98. Microprocessor 96 receives input signals from appropriate sensors, such as from a return air temperature sensor 100 disposed in a suitable return air path 102, a discharge air temperature sensor 104 disposed in a suitable discharge air path 106, from an ambient air temperature sensor 107 disposed in ambient air 84, from a coil temperature sensor 108 disposed to sense the temperature of the evaporator coil 62, and from a set point temperature selector 109.

Additional signals which may be provided for microprocessor 96, which are not shown, include signals from a refrigerant pressure sensor disposed on the high pressure side of the refrigerant circuit 48, and from various engine sensors, when engine 30 is in the prime mover arrangement 28, such as an oil level sensor, an oil pressure sensor, an engine coolant temperature sensor, and an engine speed sensor.

Microprocessor 96, among other things, controls modulation valve 64, hot gas solenoid valve 77, and a throttle or high speed solenoid 120. Application Ser. Nos. 07/728,463; 07/728,464; 07/728,467; 07/728,468; 07/728,471; 07/728/472 and 07/728,665, filed Jul. 11, 1991, all of which are assigned to the same assignee as the present application, set forth in detail various functions of unit 20 which may be controlled by microprocessor 96.

Figure 2:
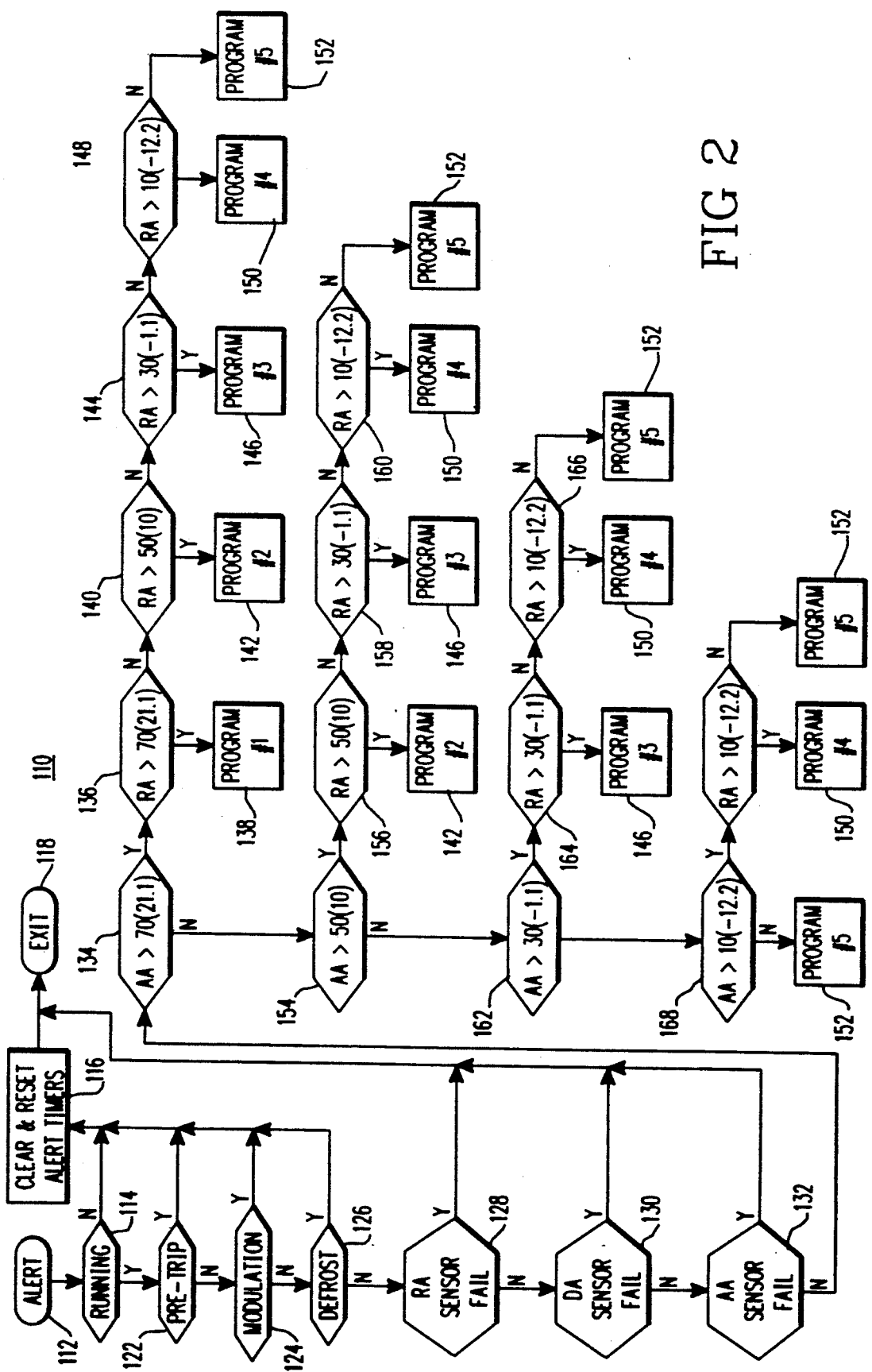
FIG. 2 is a flow chart which sets forth a program which includes method steps of the invention.

FIG. 2 is a flow chart of a program "alert" 110 which sets forth monitoring method steps according to the teachings of the invention. Program 110 is entered at 112, and an initial portion of the program checks a plurality of predetermined functions associated with transport refrigeration unit 20, to insure that unit 20 is in a normal operating mode with all sensors operative which are essential to the operation of program 110. For example, step 114 determines if unit 20 is running. If unit 20 is not running, program 110 proceeds to step 116 which clears and resets "alert" timers, which are preferably software timers in random-access-memory (RAM) controlled by microprocessor 96, which are part of electrical control 98; or, hardware timers, as desired. Program 110 then exits at 118.

If step 114 finds unit 20 running, step 122 determines if unit 20 is going through a pre-trip operation, which is a program or procedure which methodically checks all essential functions of unit 20 for operability prior to leaving a terminal area. For example, the hereinbefore mentioned Application Ser. No. 07/728,471 sets forth pre-trip checking methods which may be used. If unit 20 is in the process of a pre-trip procedure, step 122 proceeds to the hereinbefore mentioned step 116 and the program exits at 118.

If step 122 finds unit 20 is not in the process of a pre-trip check out, step 122 proceeds to step 124, which checks to determine if unit 20 is in suction line modulation. Unit 20 goes into suction line modulation, which restricts refrigerant flow via control of suction line modulation valve 64, when the temperature of the load in cargo space 90 is in a predetermined narrow temperature band very close to the set point temperature selected on set point selector 109. The hereinbefore mentioned application Ser. No. 07/728,665 discusses modulation control in detail. If unit 20 is in suction line modulation, it is functioning well and the monitoring methods of the invention are not required. Thus, step 124 proceeds to the hereinbefore mentioned step 116 and the program exits at 118.

If step 124 finds unit 20 is not in modulation, step 124 proceeds to step 126 to determine if unit 20 is in the process of defrosting evaporator 62. The hereinbefore mentioned application Ser. No. 07/728,472 describes the defrost function in detail. The monitoring methods of the invention are not required when unit 20 is in defrost, and when unit 20 is in defrost step 126 proceeds to the hereinbefore mentioned step 116, and the program exits at 118.

When step 126 finds unit 20 is not in defrost, it proceeds through steps 128, 130 and 132 which determine if return air sensor 100, discharge air sensor 104 and ambient air sensor 107 are operative. For example, a "sensor fail flag" may be checked for each sensor, with such flags being set by a sensor checking program when a sensor is found to be non-functional. The hereinbefore mentioned application Ser. No. 07/728,463, sets forth in detail a sensor checking program "sensor check" which may be used.

If any of the sensors 100, 104 or 107 are found to be non-functional, the program exits at 118, as program 110 requires accurate inputs from these sensors for proper monitoring of the operation of unit 20. If sensors 100, 104 and 107 are found to be functional, program 110 proceeds to step 134 which checks the temperature of the ambient air (AA) via ambient air sensor 107, to determine if the temperature of the ambient air 84 exceeds 70° F. (21.1° C.). If it does, program 110 enters a portion of the program which picks a specific monitoring program to be run according to the temperature of the return air 88.

More specifically, steps 136, 140, 144 and 148 determine in which of five temperature bands the temperature of the return air 88 is located at the present time, such as, for example, temperature bands: (1) greater than 70° F. (21.1° C.), in step 136; (2) less than 70° F. (21.1° C.) but greater than 50° F. (10° C.), in step 140; (3) less than 50° F. (10° C.) but greater than 30° F. ($-1.1°$ C.), in step 144; (4) less than 30° F. ($-1.1°$ C.) but not greater than 10° F. ($-12.2°$ C.), in step 148, and (5) less than 10° F. ($-12.2°$ C.), also in step 148. The "yes" branches from steps 136, 140, 144 and 148 respectively select programs #1, #2, #3, and #4, and the "no" branch from step 148 selects program #5. Programs #1, #2, #3, #4 and #5 are respectively set forth in detail in FIGS. 3A and 3B, 4A and 4B, 5A and 5B, 6A and 6B, and 7A and 7B.

If step 134 finds that the temperature of ambient air 84 does not exceed 70° F. (21.1° C.), step 134 proceeds to step 154 which determines if it exceeds 50° F. (10° C.). If it does, the second through the fifth temperature bands are checked for the location of the return air temperature via steps 156, 158 and 160, with the second temperature band now expanding to cover everything above 50° F. (10° C.).

Thus, it will be observed that the program selected is a function of temperature of the ambient air 84 and the temperature of the return air 88. For example, when the temperature of the return air exceeds 70° F. (21.1° C.), program 1 is selected when the temperature of the ambient air 84 exceeds 70° F. (21.1° C.), and program 2 is selected when the temperature of the ambient air is less than 70° F. (21.1° C.) and above 50° F. (10° C.).

The "yes" branches from steps 156, 158 and 160 respectively select programs #2, #3, and #4, and the "no" branch of step 160 selects program #5.

If step 154 finds that the temperature of ambient air 84 does not exceed 50° F. (10° C.), step 154 proceeds to step 162 which determines if it exceeds 30° F. ($-1.1°$ C.). If it does, the third through the fifth temperature bands are checked for the location of the return air temperature via steps 164 and 166, with the third temperature band now expanding to cover everything above 30° F. ($-1.1°$ C.). The "yes" branches from steps 164 and 166 respectively select programs #3 and #4, and the "no" branch of step 166 selects program #5.

If step 162 finds that the temperature of ambient air 84 does not exceed 30° F. ($-1.1°$ C.), step 162 proceeds to step 168 which determines if it exceeds 10° F. ($-12.2°$ C.). If it does, the fourth and fifth temperature bands are checked for the location of the return air temperature via a step 170, with the fourth temperature band now expanding to cover all temperatures above 10° F. ($-1.22°$ C.). The "yes" and "no" branches from step 170 respectively select programs #4 and #5.

If step 168 finds that the temperature of the ambient air does not exceed 10° F. ($-12.2°$ C.), the "no" branch selects program #5, regardless of the temperature of the return air 88.

Program 1 is set forth in detail in FIGS. 3A and 3B, with program 1 being entered at 172 and step 174 checking to determine the "commanded" operating mode of unit 20, i.e., is microprocessor 96 requesting a cooling mode or a hot gas heating mode? If a heating mode is requested, step 174 proceeds to FIG. 3B, which will be hereinafter described.

If a cooling mode is requested, step 174 proceeds to step 176 which starts a predetermined time delay, such as by starting a 2 minute timer, for example. If unit 20 has just been started, the two minute time delay will provide an opportunity for conditions to stabilize to the point where meaningful monitoring may commence. Step 176 proceeds to step 178 which determines when the time delay has ended, with step 180 updating the timer when step 178 finds the delay period has not expired.

When step 178 finds the time delay period has expired, step 178 proceeds to step 182 which checks to see if the temperature of the discharge air 92 is less than the temperature of the return air 88. During a proper functioning cooling mode the temperature of the discharge air will be less than the temperature of the return air. If the temperature of the discharge air is less than the temperature of the return air, signifying that the actual operating mode agrees with the commanded mode, step 182 proceeds to step 184.

Step 184 determines the algebraic difference $\Delta T$ between the discharge and return air temperatures. For example, the return air temperature may be subtracted from the discharge air temperature ($\Delta T = DA - RA$), which will provide a value with a negative sign "$-$" when the discharge air is cooler than the return air, which signifies that the actual operating mode is a cooling cycle, and which provides a value with a positive sign "$+$" when the discharge air is warmer than the return air, which signifies that the actual operating mode is a heating cycle.

Thus, step 182 could provide $\Delta T$ for step 184, with step 182 merely checking the algebraic sign of $\Delta T$. If the sign is negative ($-$), step 182 would proceed to step 184, and if positive, step 182 would follow the "no" branch.

Step 184 further checks the value of $\Delta T$ to see if it is equal to, or greater than, a predetermined value which signifies an acceptable value for ΔT for the ambient and return air temperatures which call program #1, e.g., the ambient and return air temperatures both exceeding 70° F. (21.1° C.), which may occur, for example, during the initial stages of temperature pull down of cargo area 90. For purposes of example, a value equal to or greater than −12° F. (−6.7° C.) is selected, with the actual value depending upon the specific characteristics of unit 20. If ΔT equals or exceeds −12° F. (−6.7° C.), unit 20 is functioning properly and program #1 exits at 186.

If step 184 finds that ΔT is not equal to or greater than −12° F. (−6.7° C.), step 184 proceeds to step 188 which starts a predetermined time delay to give unit a chance to meet the requirements of step 184. Since unit 20 is actually in the commanded cooling mode, as determined by step 182, the time delay started by step 188 may be fairly long, as unit 20 and the load in the cargo space 90 are not in any immediate danger. For purposes of example, a time delay of 10 minutes is selected.

Steps 190, 192 and 194 maintain program #1 in a program loop until step 190 detects that ΔT is equal to or greater than the selected parameter, i.e., −12° F. (−6.7° C.), or the time delay has expired, with steps 192 and 194 respectively detecting expiration of the time delay, and updating the delay time when step 192 finds the time delay has not expired. When step 190 finds that ΔT is equal to or greater than −12° F. (−6.7° C.), or step 192 detects expiration of the time delay, step 196 checks to see which of these two possible events occurred by checking to see if the time delay expired. If the time delay did not expire, step 190 broke the loop and program #1 exits at 198, since the performance of unit 20 is now in the normal range.

If step 196 finds that the time delay expired, step 196 proceeds to step 200 which compares ΔT with a lower value than used in step 184, with the lower value being that value, which if equaled or exceeded, will permit unit 20 to continue to operate, even though performance is marginal. For purposes of example, the marginal value is selected to be −6° F. (−3.3° C.). If ΔT is equal to or greater than −6° F. (−3.3° C.), step 200 proceeds to step 202 which stores a warning alarm code indicating that the refrigeration capacity should be checked, and step 202 also turns on an alarm indicator, such as a steady light on the control panel of unit 20, to call the marginal operation of unit 20 to the attention of one in charge of unit 20. Program #1 then exits at 204.

If step 200 finds that even the lower marginal value is not exceeded, step 200 proceeds to step 206 which provides another time delay to give unit 20 the chance to enter the marginal range, such as by starting a 30 second timer. Steps 208, 210 and 212 start a program loop which is broken when operation of unit 20 enters the marginal range, or the time delay expires. Step 214 determines which event broke the loop, with the program exiting at 218 when step 214 finds that the time delay did not expire. If expiration of the time delay broke the loop, step 216 stores a fault alarm code indicating that refrigeration capacity is low, an alarm is turned on to notify the operator, such as by flashing a light on the associated display panel, and step 216 also initiates shut-down of unit 20 since its performance does not merit further operation.

If step 182 finds that the temperature of the discharge air 92 is not less than the temperature of the return air, i.e., step 182 finds that ΔT has a positive sign (+), something serious may be wrong with unit 20, as the unit is not cooling as commanded, and may not be functioning at all, or worse, it could be functioning in a heating mode which would quickly be adverse to a load in cargo space 90.

Step 182 proceeds to step 220 which starts a relatively short time delay, such as 30 seconds, for the temperature of the discharge air to become less than the temperature of the return air. Steps 222, 224 and 226 start a program loop which is broken when the discharge air temperature becomes less than the return air temperature, as detected by step 222, or the time delay expires, as controlled by steps 224 and 226. When the loop is broken, step 228 determines which event occurred by checking the delay timer. If the delay timer has not expired, the actual mode now agrees with the commanded mode, and the program exits at 230.

On the next running of program #1, step 182 will then start the hereinbefore described checks to determine if a warning alarm or a shut-down alarm should be generated. If step 228 finds that the delay timer expired, step 232 stores a fault alarm code which indicates a cooling cycle fault, a flashing alarm is initiated, and unit 20 is shut down.

Thus, unit 20 may be shut down as early as 2 minutes and 30 seconds after being turned on, if the actual mode does not match the commanded mode, even at the very start of temperature pull down, which is much faster than monitoring systems of the prior art. If the actual mode and commanded mode match, unit 20 may be shut down as early as 12 minutes and 30 seconds after unit start-up, when the refrigeration capacity does not come up to a predetermined marginal level.

When step 174 finds that the commanded mode is heating, step 174 proceeds to step 234 which starts a predetermined time delay, such as 10 minutes, for the same reasons as described relative to step 176. Step 240 then checks to determine if the actual operating mode matches the commanded operating mode, by determining if the discharge air is warmer than the return air. If it is, the actual mode agrees with the commanded mode, and step 240 proceeds to step 242 which determines if unit 20 is operating above a predetermined minimum heating level, such as a differential of +2° F. (+1.1° C.), for example. If unit 20 is operating above this minimum heating level, step 242 proceeds to step 244 which determines if the heating level is normal for the ambient and return air temperatures which result in the running of program 1, such as a differential of +10° F. (+5.6° C.), for example. If unit 20 is operating in the normal range, the program exits at 246.

If unit 20 is not operating at the level required by step 244, step 244 proceeds to step 248 which starts a predetermined time delay to give unit 20 time to perform at an acceptable level. Since the actual and commanded modes agree, the time delay may be relatively long, such as 10 minutes, for example. Steps 250, 252 and 254 then start a program loop which is broken by unit 20 performing at an acceptable level, which is detected by step 250, or by expiration of the time delay, which is controlled by steps 252 and 254. In this initial program, the acceptable level may be reduced slightly in step 250, from the value used in step 244, if desired. For example, a value of +8° F. (+4.4° C.) may be used.

Step 256 determines which event broke the loop, and if the time delay has not expired, program #1 is exited at 258, as operation of unit 20 is now acceptable. If step 256 finds that the time delay expired, step 260 stores a warning alarm code indicating that the refrigeration capacity should be checked, and a steady alarm light is illuminated on the associated display.

If step 242 finds that the low initial ΔT is not equaled or exceeded, then step 242 proceeds to step 262 which starts a relatively short time delay, such as 30 seconds, to give unit 20 time to exceed the initial threshold of performance set by step 242, i.e., a ΔT of at least +2° F. (+1.1° C.). Steps 264, 266 and 268 start a program loop which is broken when the minimum performance is achieved, as detected by step 262, or by expiration of the short time delay, which is controlled by steps 266 and 268.

Step 270 determines which of the two events broke the loop, with achievement of the minimum level of performance causing the program to exit at 274, for further evaluation of the performance on the next running of program #1. If unit 20 fails to come up to the threshold level of performance, step 270 proceeds to step 276 which stores a fault alarm code indicating that the refrigeration capacity is low, a flashing alarm is energized, and unit 20 is shut down.

If step 240 finds that the actual operating mode of unit 20 does not match the commanded mode, step 278 starts a relatively short time delay, such as 30 seconds, for such agreement to place. Steps 280, 282, and 284 start a program loop which is broken by the actual mode matching the commanded mode, as detected by step 280, or by the expiration of the short time delay, as controlled by steps 282 and 284, whichever occurs first. Step 286 determines which event broke the loop, with program #1 exiting at 288 when step 286 finds that the time delay has not expired. When the time delay has been found to be expired, step 286 proceeds to step 290 which stores a fault alarm code indicating a heating cycle fault, a flashing alarm is energized, and unit 20 is shut down, as continued operation could cause a perishable load to freeze.

Thus, when unit 20 is in a commanded heating mode, unit 20 will be shut down as quickly as 2 minutes and 30 seconds from initiation of operation when the actual operating mode does not match the commanded mode, and as quickly as 12 minutes and 30 seconds, when the actual and commanded modes agree, but a predetermined threshold performance is not achieved.

Figure 3A:
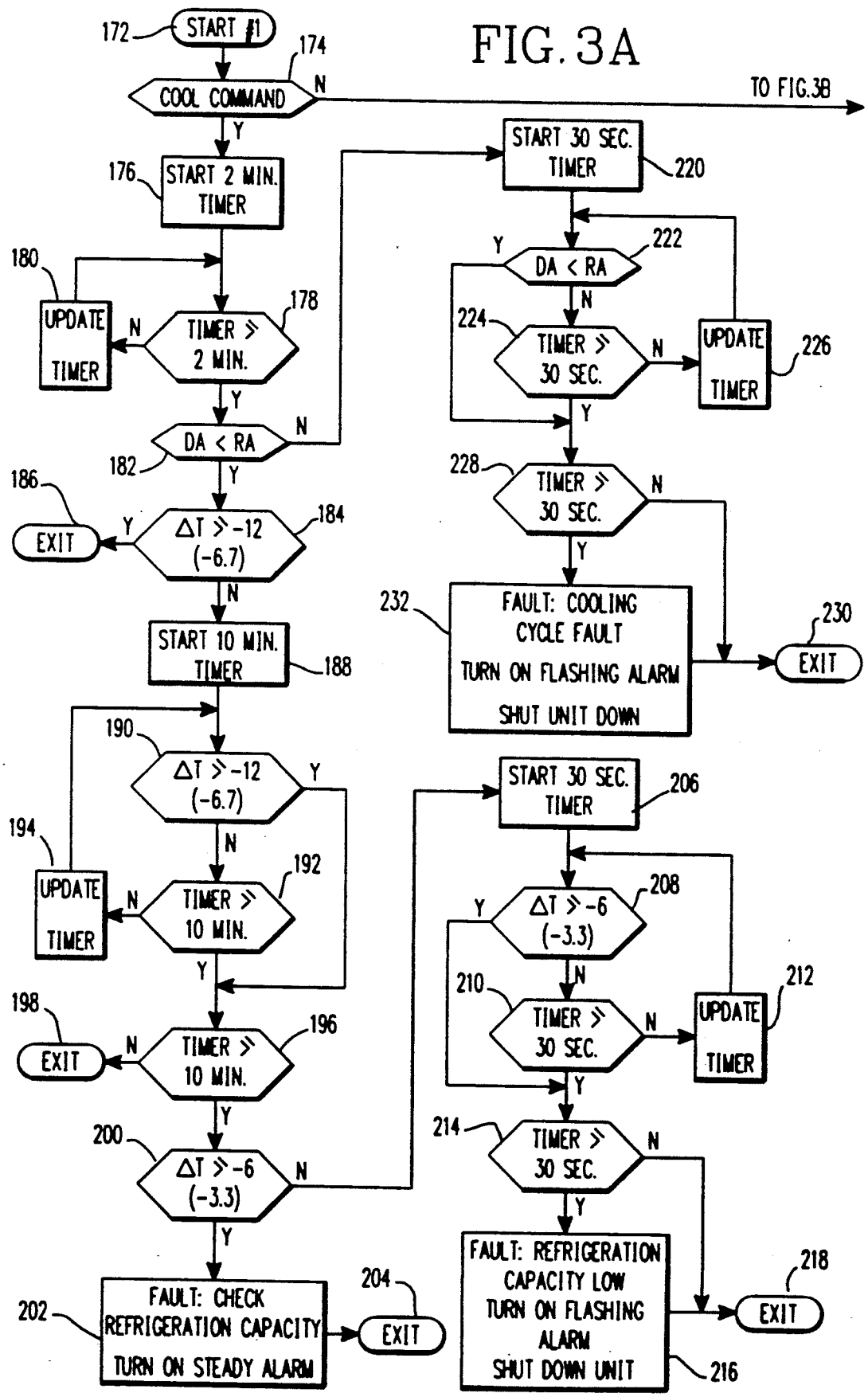
FIGS. 3A and 3B may be assembled to provide a detailed flow chart of a program #1 which is called by the program of FIG. 2 in response to a predetermined relationship between ambient and return air temperatures.
Figure 3B:
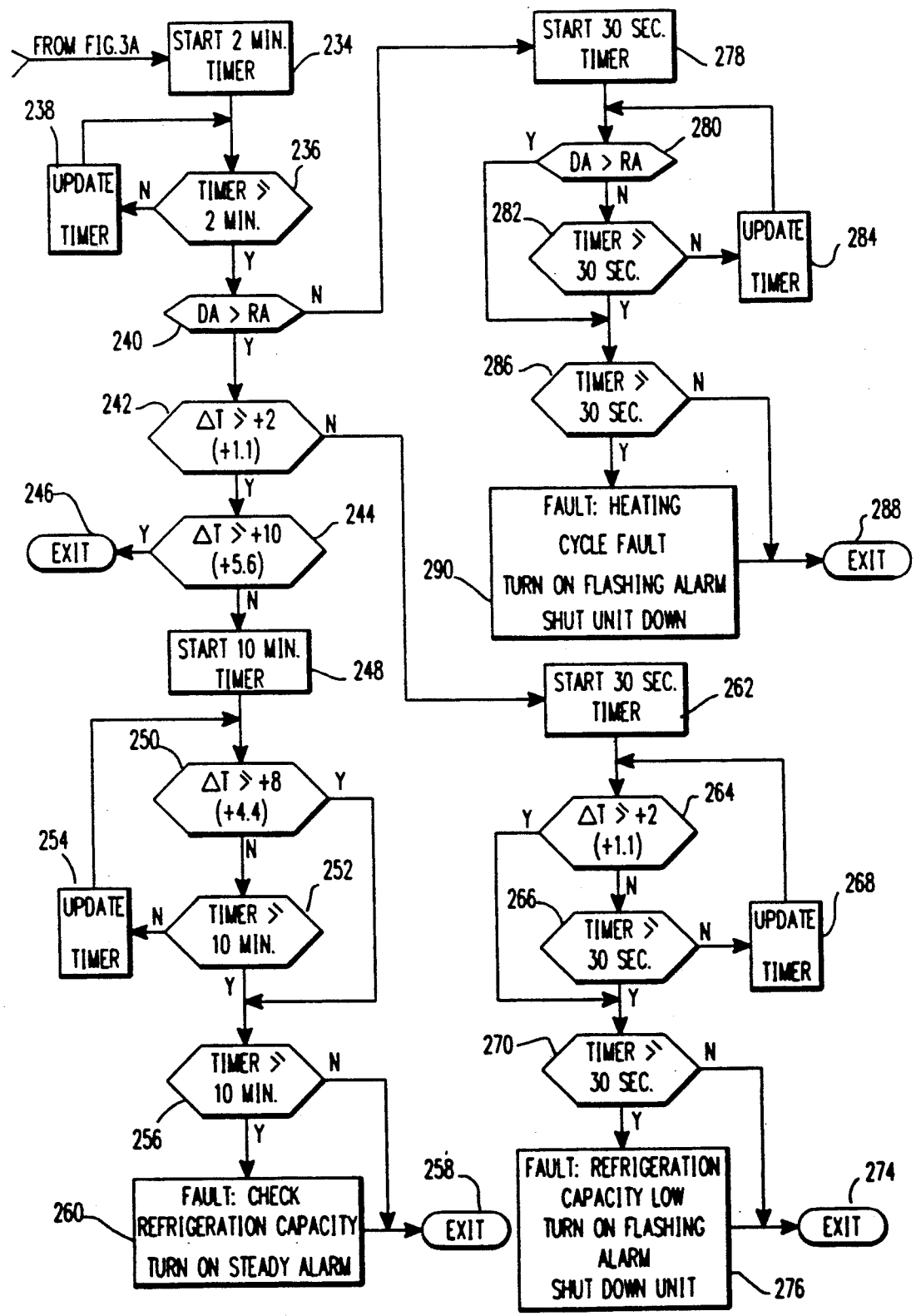
Figure 4A:
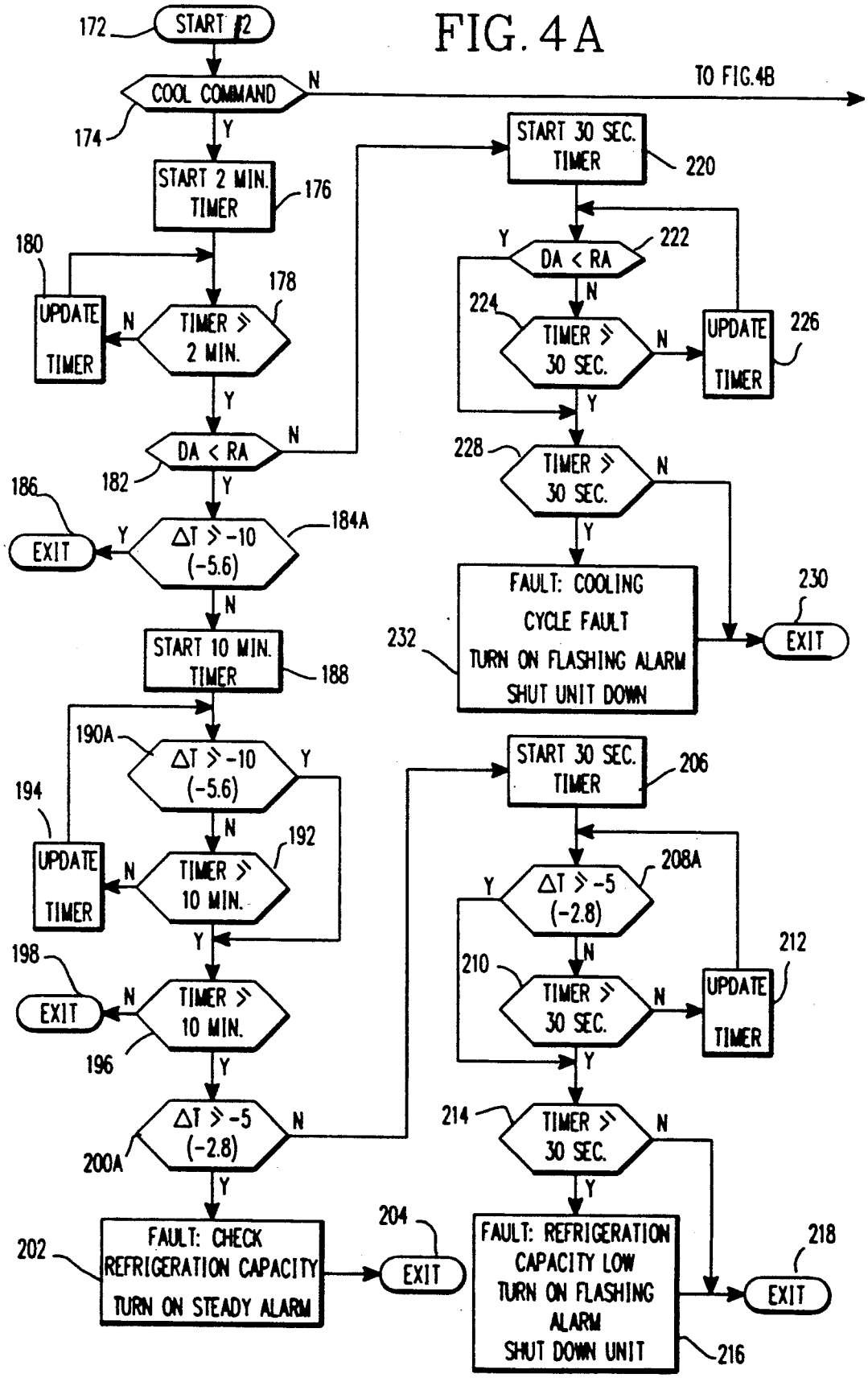
FIGS. 4A and 4B may be assembled to provide a detailed flow chart of a program #2 which is called by the program of FIG. 2 in response to a predetermined relationship between ambient and return air temperatures.
Figure 4B:
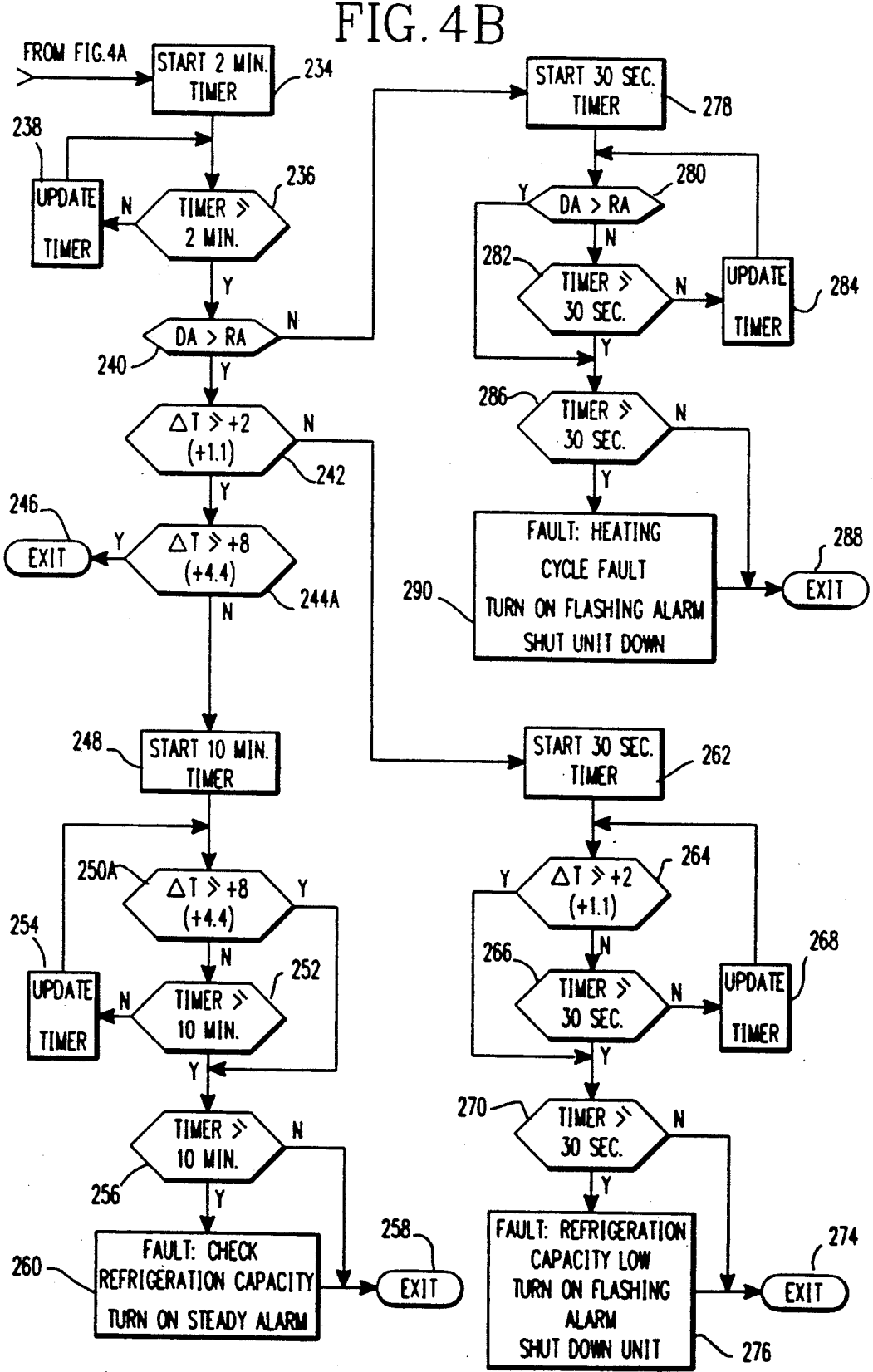
Figure 5B:
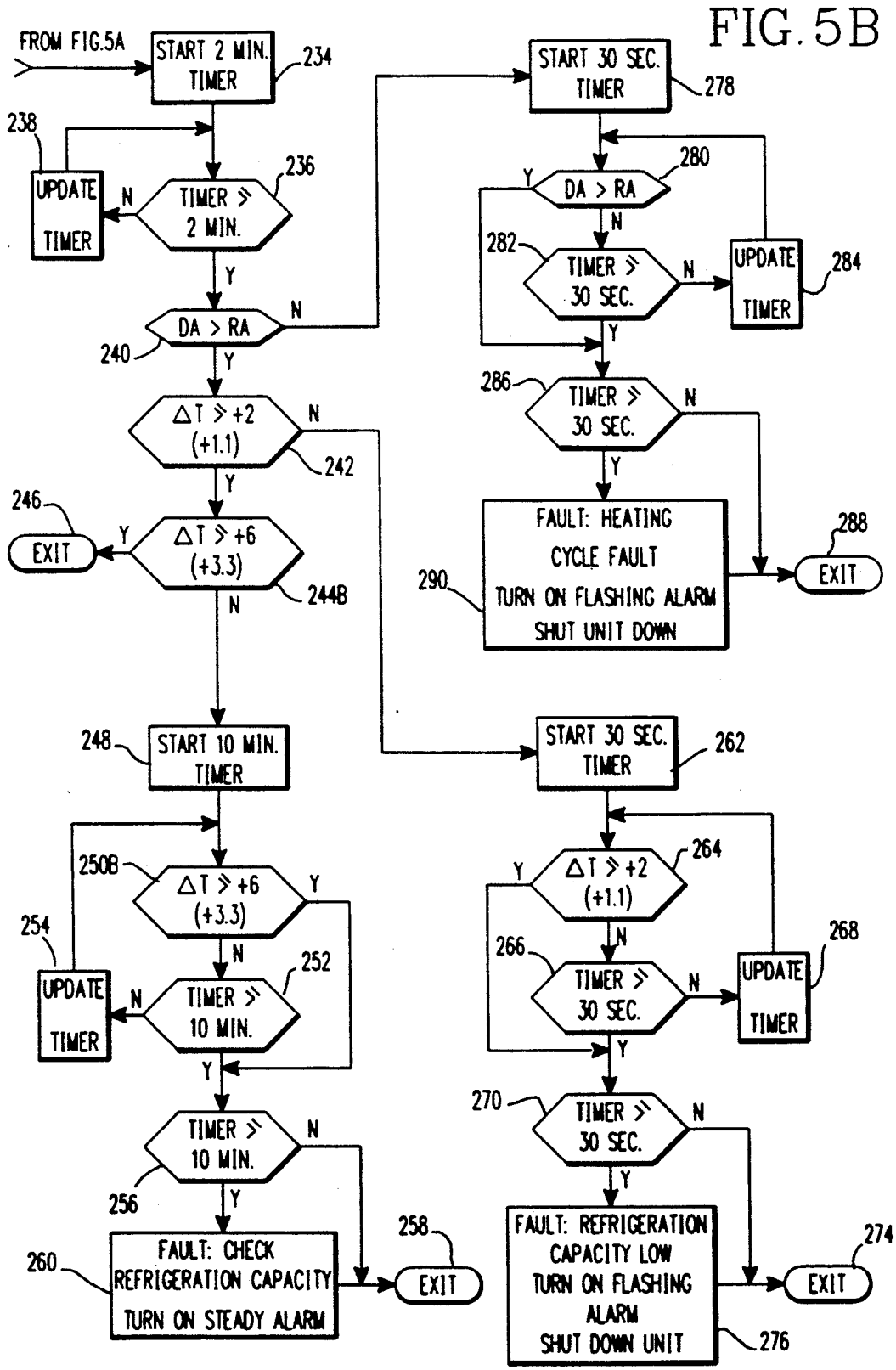
Figure 6A:
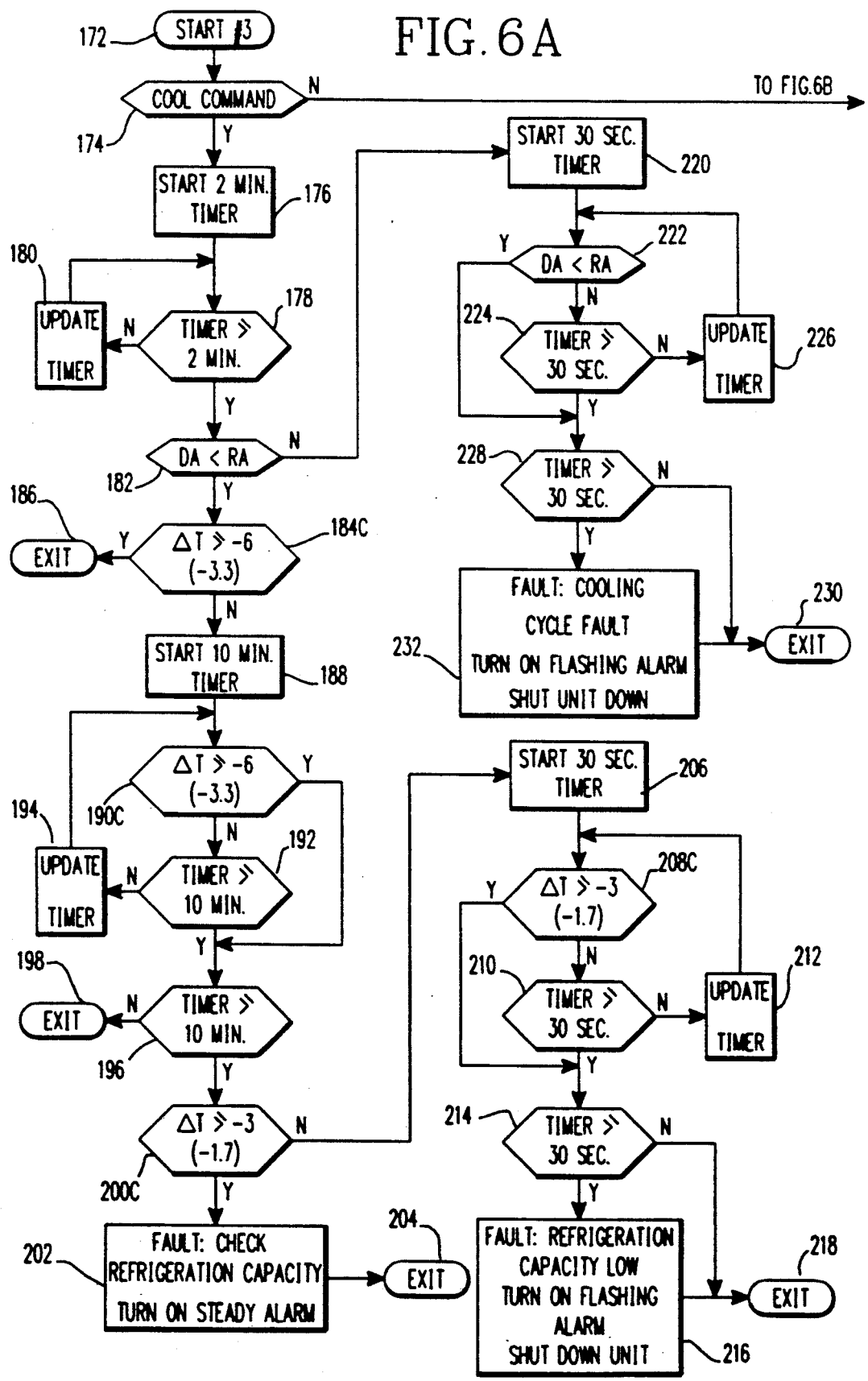

Programs #2, #3, #4 and #5 have many steps similar to those of program #1, and like steps are given the same reference numerals used FIGS. 3A and 3B. Thus, it will not be necessary to describe them again. Similar steps except for different values are identified with the same reference numerals with the addition of a letter, with letters A, B, C and D being respectively used in Programs #2, #3, #4 and #5. New steps in programs #4 and #5 are identified with new reference numerals. Only those steps in programs #2, #3, #4 and #5 which are different, or which use different values, will be described in detail.

More specifically, programs #2, #3, #4 and #5 respectively shown in FIGS. 4A, 5A, 6A, and 7A, use the progressively lower values of −10°, −8°, −6° and −4° F. (−5.6°, −4.4°, −3.3° and −2.2° C.) in steps 184A, 184B, 184C and 184D, as well as in steps 190A, 190B, 190C and 190D, to establish the level between normal and marginal operation. In like manner, steps 200A, 200B, 200C and 200D, as well as steps 208A, 208B, 208C and 208D, use the progressively lower values of −5°, −4°, −3°, and −1.5° F. (−2.8°, −2.2°, −1.7°, and −0.83° C.) to establish the level between unacceptable and marginal operation. As the return air temperature drops, the ΔT, during normal operation drops, and the values are adjusted accordingly.

In like manner, programs #2, #3, #4 and #5 respectively shown in FIGS. 4B, 5B, 6B, and 7B use the values of +8, +6, +6 and +4 in steps 244A, 244B, 244C, and 244D, as well as in steps 250A, 250B, 250C and 250D, to reflect the normal ΔT during heating mode as the return air temperature drops.

Figure 7A:
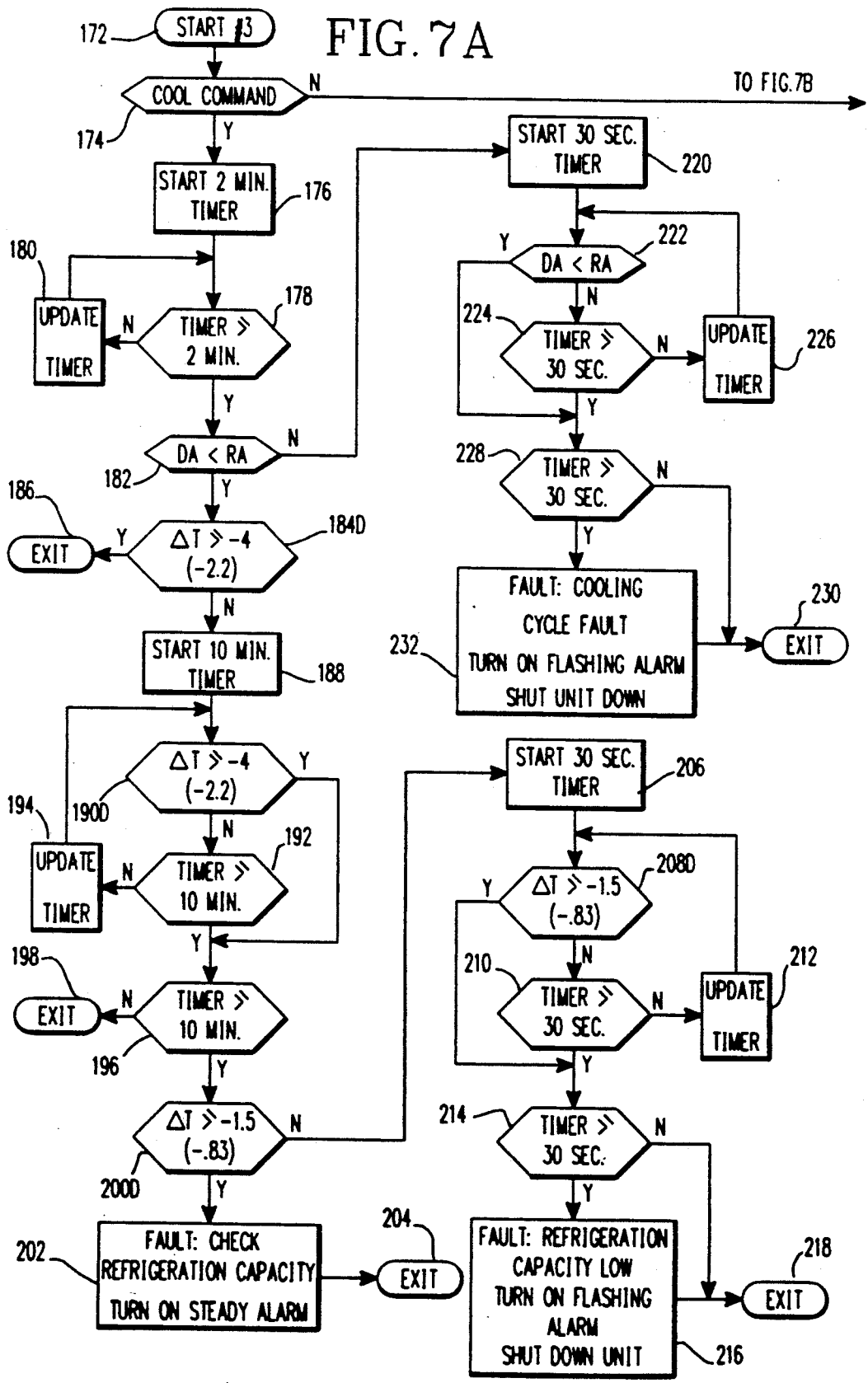
FIGS. 7A and 7B may be assembled to provide a detailed flow chart of a program #5 which is called by the program of FIG. 2 in response to a predetermined relationship between ambient and return air temperatures.
Figure 7B:
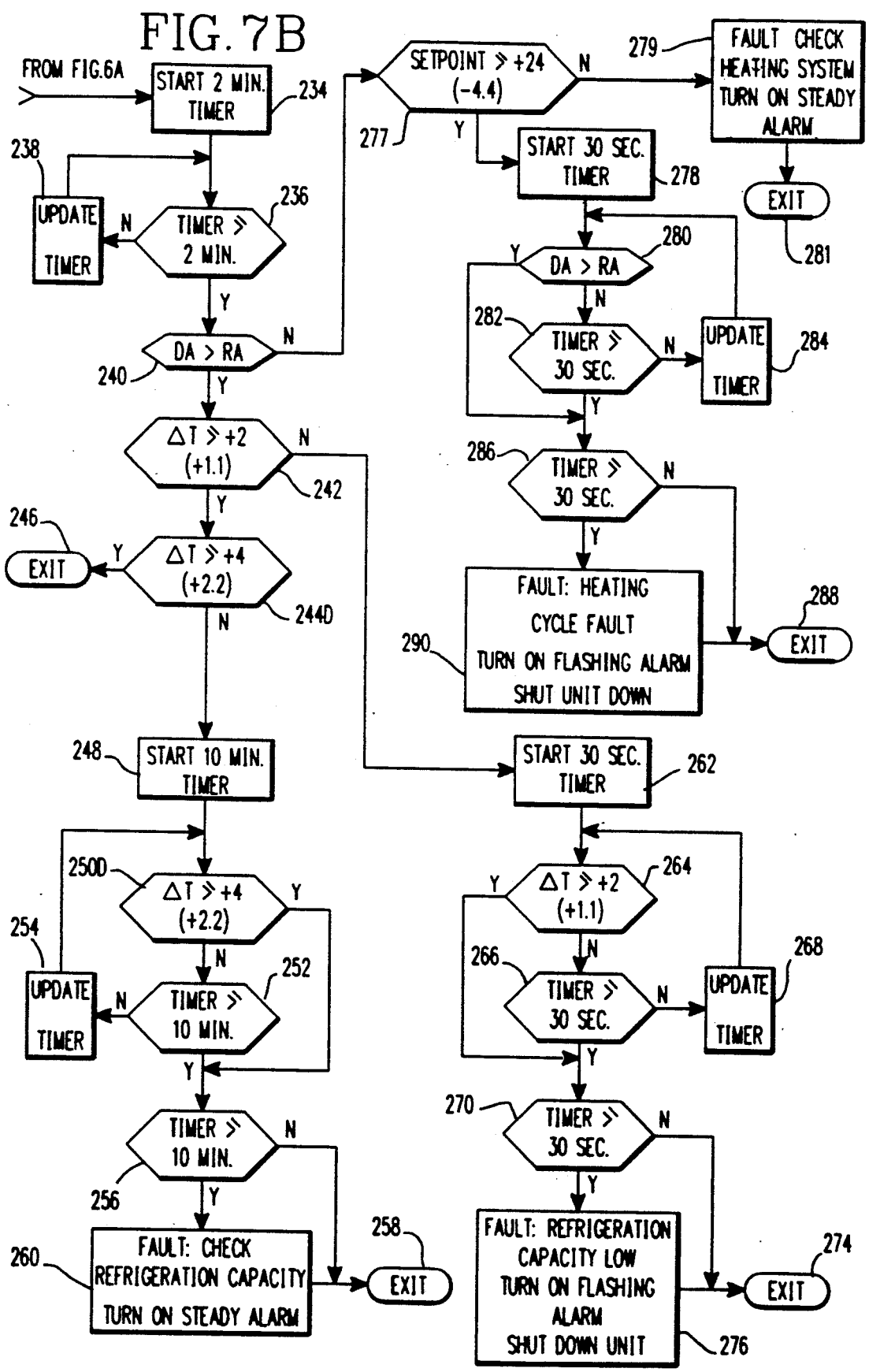

Programs #4 and #5, due to the range of return air temperatures, may be associated with either a fresh or a frozen load in cargo space 90, and similar steps 277, 279 and 281 have been added to FIGS. 6B and 7B. When step 240, which is associated with the heating mode, finds that the actual operating mode does not agree with the commanded heating mode, it proceeds to step 277 which determines if the set point temperature selected by selector 109 is set to condition a fresh load or a frozen load. For example, step 277 may determine if the selected set point is equal to or greater than +24° F. (−4.4° C.). If set point is less than +24° F. (−4.4° C.) then the fact that unit 20 will not heat is not critical, and step 277 advances to step 279 which stores a warning alarm code indicating that the heating system should be checked, and a steady warning alarm indicator is illuminated to notify the operator. It is not necessary to shut unit 20 down.

If step 277 finds that the set point is equal to, or greater than, +24° F. (−4.4° C.), then step 277 proceeds to the hereinbefore described portion of the program, which starts with step 278.

FIG. 8 is a chart which summarizes the parameters used in the five programs. The brackets used in column RA, i.e., the return air column, indicate that the maximum values in the brackets should be omitted when it is the first program called by a specific ambient air temperature range. As hereinbefore explained, if the ambient air temperature exceeds 70° F. ((21.1° C.), then programs #2, #3, and #4 have upper limits for the return air temperature range, while when lower ambient air temperatures directly call programs #2, #3, and #4 as the initial programs, then the return air temperature shown in the row associated with the program number shows only the minimum temperature as it covers all return air temperatures above the number listed.

Figure 9:
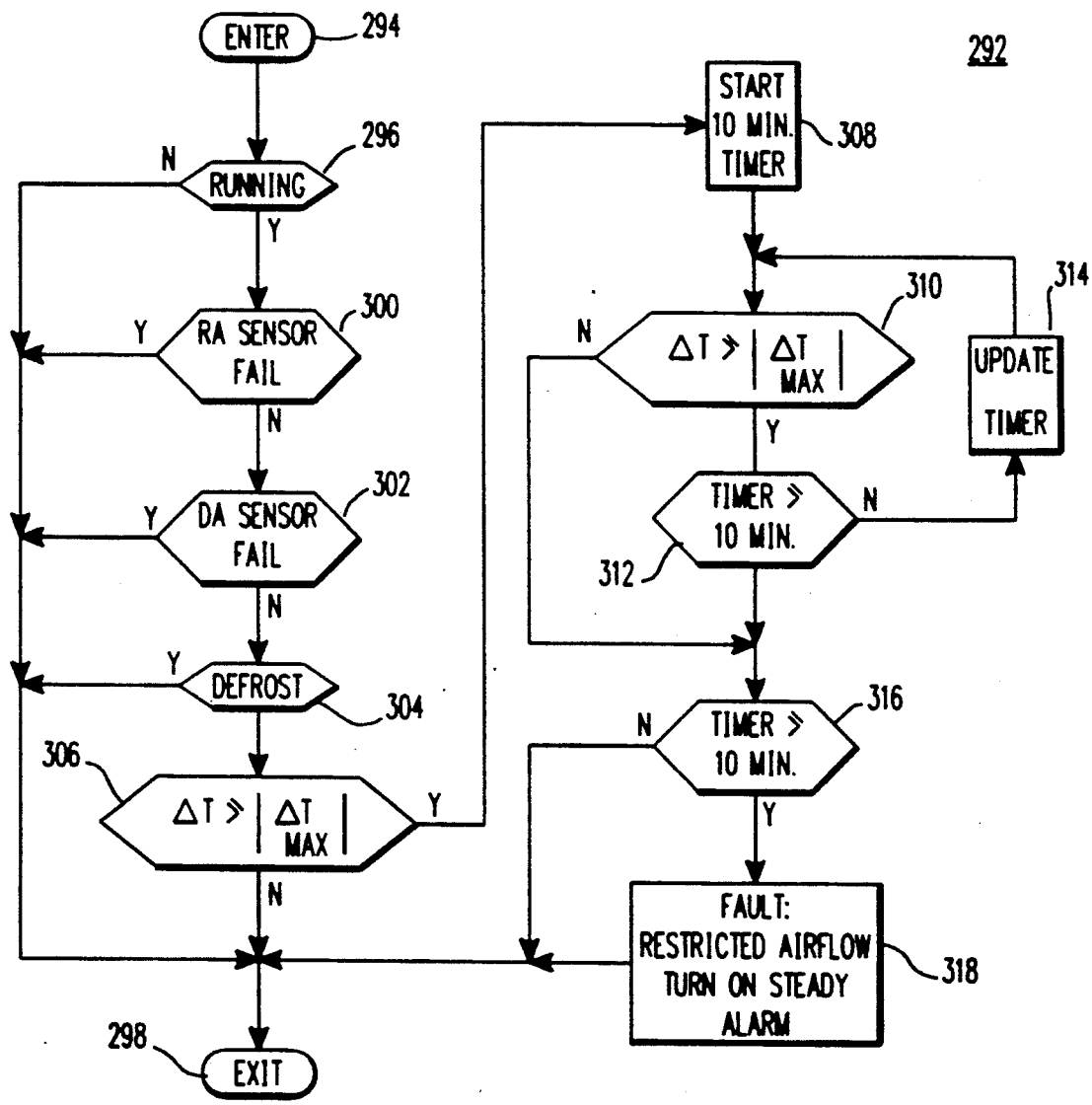
FIG. 9 is a flow chart of a program which may also be called by the program set forth in FIG. 2, regardless of the relationship between ambient air and return air temperatures, to check for restricted air flow in the associated cargo space.

The programs to this point have utilized minimum values of ΔT which, if not exceeded, indicate either marginal or unacceptable performance of unit 20. FIG. 9 is a flow chart of a program 292 which may be optionally run each time one of the programs #1 through #5 is run which utilizes the comparison of the actual ΔT with a maximum value of ΔT. If the actual value of ΔT exceeds the predetermined maximum value, which may be a value of about +24° F. (−4.4° C.), for example, it indicates a restriction in the air flow path, such as may be caused by improper loading of cargo space 90, or a subsequent shifting of the load in cargo space 90 which results in the air flow path being restricted.

More specifically, program 292 is entered at 294 and an initial portion of the program insures that unit 20 is in a normal operating mode with all essential sensors operative. For example, step 296 determines if unit 20 is running. If unit 20 is not running, step 296 exits program 292 at 298. If step 296 finds unit 20 running steps 300 and 302 determine if return air sensor 100 and discharge air sensor 104 are operative. If either is found to be nonfunctional, program 292 exits at 298. If sensors 200 and 104 are found to be functional, program 292 proceeds to step 304 which determines if unit 20 is in defrost. If so, program 292 exits at 298. If unit 20 is not in defrost, step 306 obtains the maximum value of ΔT, such as may be stored in a read-only-memory (ROM) associated with control 98, and step 306 compares this maximum value with the actual value of ΔT. If the actual value does not exceed the maximum value, there is no restriction in the air flow path, and program 292 exits at 298.

If step 306 finds that the actual value exceeds the allowable maximum value, then step 306 proceeds to step 308 which starts a predetermined time delay, such as 10 minutes, for example. Steps 310, 312, and 314 create a program loop which is broken when the actual value of ΔT becomes less than the maximum allowable value, detected by step 310, or the delay time expires, monitored by steps 312 and 314, which ever occurs first. Step 316 determines which event broke the loop, with step 316 proceeding to the program exit 298 when step 316 finds that the delay time had not expired. When step 316 finds that the delay time has expired, then step 316 proceeds to step 318 which stores a fault code indicating that the evaporator air flow path is restricted, and a steady alarm is energized which notifies the operator. Step 318 then proceeds to the program exit.

In summary, there has been disclosed new and improved methods of monitoring a transport refrigeration system, which provide early warnings and early shut-downs for marginal and unacceptable operation, even during initial temperature pull down of the cargo space 90. The monitoring methods monitor the differential between the evaporator return air and discharge air, and it compares the actual differential with acceptable minimum values which vary as a function of the ambient and return air temperatures. Appropriate early warnings are issued for marginal performance, and early system shut-downs are initiated for unacceptable performance. As an option, the actual differential may also be compared with a predetermined maximum value, to detect a restricted air flow.

We claim:

1. A method of monitoring a transport refrigeration system which conditions air returned from a cargo space via commanded cooling and heating modes, as required to hold a predetermined set point temperature, and discharges the conditioned air back into the cargo space, with the system having sensors for monitoring the temperatures of the return air, discharge air, and ambient air, characterized by the steps of:
   providing an algebraic difference ΔT between the temperatures of the return air and the discharge air,
   selecting parameters for comparison with ΔT as a function of the ambient temperature and the return air temperature,
   and comparing ΔT with the selected parameters to detect a malfunction in the operation of the transport refrigeration system, regardless of temperature of the return air relative to the selected set point temperature.

2. The method of claim 1 including the step of checking the temperature sensors for failure as a condition precedent to providing the algebraic difference ΔT.

3. The method of claim 1 wherein the step of selecting parameters selects minimum values of ΔT which must be met by the comparison step to enable continued operation of the transport refrigeration system.

4. The method of claim 3 wherein the parameters include normal, warning and shutdown values of ΔT, with the step of selecting parameters reducing the magnitudes of the normal, warning and shutdown values of ΔT in predetermined steps as the temperature of the return air is reduced.

5. The method of claim 1 wherein the step of selecting parameters selects values for both cooling and heating modes, with the method including the steps of:
   determining the commanded mode,
   and using the selected parameters associated with the commanded mode in the comparison step.

6. The method of claim 1 including the steps of:
   determining the commanded mode,
   comparing the algebraic sign of ΔT with the commanded mode to determine if the actual mode is consistent with the commanded mode,
   providing a predetermined time delay when the comparison step finds the actual and commanded modes are not consistent,
   and shutting the transport refrigeration system down if the actual mode is still inconsistent with the commanded mode at the end of the time delay.

7. The method of claim 1 including the steps of:
   determining the commanded mode,
   comparing the algebraic sign of ΔT with the commanded mode to determine if the actual mode is consistent with the commanded mode,
   checking the selected set point temperature to determine if it indicates a frozen load, when the comparison step finds the actual and commanded modes are not consistent,
   providing a warning alarm when checking step finds the set point temperature is associated with a frozen load,
   providing a predetermined time delay when the comparison step finds the actual and commanded modes are not consistent, and the checking step finds the set point temperature is not associated with a frozen load,
   and shutting the transport refrigeration system down if the actual mode is still inconsistent with the commanded mode at the end of the time delay.

8. The method of claim 1 wherein the step of selecting parameters selects minimum values which establish normal, marginal, and improper operation of the transport refrigeration system, and including the steps of:
   providing a warning alarm signal when marginal operation is detected by the comparison step,
   and identifying the nature of the marginal operation.

9. The method of claim 8 including the steps of:
   providing a fault alarm signal when improper operation of the transport refrigeration system is detected,
   identifying the nature of the improper operation,
   and shutting the transport refrigeration system down.

10. The method of claim 1 including the step of:
    providing a predetermined time delay before the step of providing the algebraic difference ΔT, to prevent the use of temperature signals immediately after start-up of the transport refrigeration system.

11. The method of claim 1 including the steps of:
    providing a first predetermined time delay before the step of providing the algebraic difference ΔT, to prevent the use of temperature signals immediately after start-up of the transport refrigeration system,
    determining the commanded mode,
    comparing the algebraic sign of ΔT with the commanded mode to determine if the actual mode is consistent with the commanded mode, providing a second predetermined time delay, which is shorter than the first predetermined time delay, when the comparison step finds the actual and commanded modes are not consistent, and shutting the transport refrigeration system down if the actual mode is still inconsistent with the commanded mode at the end of the second predetermined time delay.

12. The method of claim 11 including the steps of:

providing a third predetermined time delay when the actual mode is consistent with the commanded mode, and the comparison step detects a malfunction, with the length of the third predetermined time delay being a function of the commanded mode and the magnitude of difference between $\Delta T$ and the applicable selected parameter.

13. The method of claim 12 wherein the third predetermined time delay is shorter than the first predetermined period of time when the commanded mode is heating and $\Delta T$ does not exceed a first predetermined value.

14. The method of claim 13 including the step of shutting the transport refrigeration system down when $\Delta T$ does not exceed the first predetermined value at the end of the third predetermined period of time.

15. The method of claim 12 wherein the third predetermined time delay is longer than the first predetermined period of time when the commanded mode is heating and $\Delta T$ exceeds a first predetermined value but does not exceed a second predetermined value.

16. The method of claim 15 including the step of providing a warning alarm when $\Delta T$ does not exceed the second predetermined value at the end of the third predetermined time delay.

17. The method of claim 12 wherein the third predetermined time delay is longer than the first predetermined period of time when the commanded mode is cooling and $\Delta T$ does not exceed a first predetermined value.

18. The method of claim 17 including the steps of:

comparing $\Delta T$ with a second predetermined value, which is less than the first predetermined value, when $\Delta T$ does not exceed the first predetermined value at the end of the third predetermined period of time, providing a warning alarm signal when the comparison step finds $\Delta T$ exceeds the smaller second predetermined value, providing a fourth predetermined time delay, which is shorter than the third predetermined time delay when the comparison step finds $\Delta T$ does not exceed the smaller second predetermined value, and shutting the transport refrigeration system down when $\Delta T$ does not exceed the smaller second predetermined value at the end of the fourth predetermined time delay.

19. The method of claim 1 wherein the step of selecting parameters provides different ranges of acceptable and marginal performance for different return air temperatures, and the step of comparing $\Delta T$ with the selected parameters compares $\Delta T$ with the parameters regardless of the associated range, whereby the transport refrigeration system is monitored during temperature pull down of the cargo space.

20. The method of claim 1 wherein the step of selecting parameters selects a maximum value, and including the steps of:

comparing $\Delta T$ with said selected maximum value, and providing an alarm signal which indicates restricted air flow when the comparison step finds that $\Delta T$ exceeds said selected maximum value.

21. The method of claim 1 wherein the step of selecting parameters selects minimum values which must be met by the comparison step to enable continued operation of the transport refrigeration system, and a maximum value, and including the steps of:

comparing $\Delta T$ with said selected maximum value, and providing an alarm signal which indicates restricted air flow when the comparison step finds that $\Delta T$ exceeds said selected maximum value.

* * * * *